A. WOLBER.
PNEUMATIC TIRE FOR VEHICLE WHEELS.
APPLICATION FILED JUNE 16, 1908.
956,464.
Patented Apr. 26, 1910.
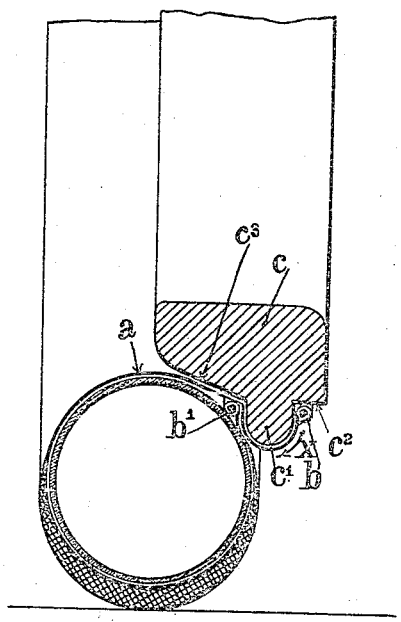
WITNESSES
INVENTOR
Antoine Wolber
BY
ATTORNEYS

UNITED STATES PATENT OFFICE.

ANTOINE WOLBER, OF VAILLY, AISNE, FRANCE.

PNEUMATIC TIRE FOR VEHICLE-WHEELS.

956,464.  Specification of Letters Patent.  Patented Apr. 26, 1910.

Application filed June 16, 1908. Serial No. 438,733.

*To all whom it may concern:*

Be it known that I, ANTOINE WOLBER, a citizen of the Republic of France, residing at Vailly, France, and whose postal address is Vailly s. Aisne, Aisne, France, constructor, have invented certain Improvements in Pneumatic Tires for the Wheels of Vehicles, for which I have obtained a patent in France November 19, 1907, (not yet issued;) in Germany November 28, 1907, (not yet issued;) in Italy November 19, 1907, (not yet issued,) and in Belgium May 18, 1908, (not yet issued,) of which the following is a specification.

This invention relates to a pneumatic tire for the wheels of vehicles of all kinds and characterized by the use of an outer cover of suitable construction the edges of which are provided with inextensible rods or wires of any suitable kind, in combination with a wooden or metal rim comprising a beading in proximity to one of its edges, one of the rings of the outer cover being engaged on the outer side of the beading, the outer cover covering the said beading, while the other ring rests against the inner side of this beading above the edge of the outer cover which covers it, in such a manner that the pneumatic tire projects to a large extent to one side of the rim while the rim projects beyond the tire on the opposite side. This projection or overlapping of the tire upon the rim increases the vertical resiliency inherent in all pneumatic tires, and as a result of the independence of the overlapping part of the tire the latter permits of lateral resiliency and deformation. The tire may be arranged with its projecting part either outside or inside the wheel. If inside then the projecting portion of the rim serves as a lateral protection for the pneumatic tire.

Beaded rims are already known, but the two securing wires are arranged on the same side of this beading. The result of this is that the tire escapes from the rim under lateral strains. Rims are also known which comprise a groove in which lies one of the wires of the outer cover constituted by a large cable against which the second, smaller cable bears. But it has been found that under the influence of the pressure the second wire enters the groove and lifts the large cable which leaves the groove and the tire escapes from the rim. It is in order to obviate these defects that the tire which forms the object of the present invention has been devised, its principal characteristic being that the wires are arranged on either side of a beading on the rim, the tire being largely outside the rim.

Part of a tire and rim in which my invention is embodied are shown in vertical section in the accompanying drawing.

The outer cover $a$ of the pneumatic tire with its wires $b$, $b^1$ is mounted in the manner hereinafter described upon the rim $c$ which is provided with the beading $c^1$ in proximity to one of its edges. The cable $b$ engaged upon the rim, bears against the outer side of the beading $c^1$ of the rim $c$. The edge of the outer cover covers this beading while the other part of the outer cover incloses the air chamber when the wire $b^1$ is arranged in position, against the inner side of the beading $c^1$ above the cover. The air chamber is thus completely protected from the rim $c$ and when inflated it presses the cables $b$ and $b^1$ against each side of the beading $c^1$ and the tire is thus firmly held upon the rim. The wire bead cannot pass over the beading $c^1$ as it is inextensible, and as its diameter will not permit of it. Furthermore it cannot escape from the edge $c^2$ of the rim because the pressure of the air chamber draws the fabric of the outer cover in the direction indicated by the arrow $x$; the cable $b^1$ is likewise constantly drawn by the said pressure against the inner edge of the beading $c^1$ and being inextensible it is unable to pass over this beading. Consequently so long as the air chamber is inflated the wires $b$ and $b^1$ are necessarily held on either side of the beading $c^1$ and the tire cannot leave the rim $c$.

By reason of the location of the tire to a large extent outside the plane of the rim, far greater vertical resiliency than is obtainable with pneumatic tires which bear entirely upon the rim is secured, while at the same time a lateral resiliency is attained which permits of a displacement which greatly decreases the shock of an obstacle.

To remove the tire, the air chamber is deflated. A part of the wire $b^1$ may then readily be pressed down over the inclined surface $c^3$ of the rim thereby permitting the opposite part to be brought beneath the beading $c^1$; the wire $b$ may then readily be slid along the parts $c^2$ of the rim, and the tire is thus completely and practically instantly detached from the rim.

For repairs, the air chamber being deflated, the part $b^1$ of the outer cover may readily be turned back thus uncovering the air chamber which can be readily and completely examined, the tire being held upon the rim by the part $b$. It will be noticed that as the air chamber is entirely inclosed by the part $a$ it is not necessary to take into account the wire $b^1$ which is automatically brought by the pressure of the air chamber when being inflated against the inner part of the beading $c^1$.

The tire may be mounted upon the projecting part of the rim either inside or outside and in this latter case this projecting part of the rim constitutes an effective protection for the tire from rubbing, either against the curbing of pathways or in case the wheel should come in contact with those of other vehicles. Besides the actual construction of the rim also permits of running upon the rim itself as only the beading then comes into contact with the ground and any injury which the beading might experience would be of no importance as regards the attachment and detachment of the pneumatic tire or its efficient retention upon the rim.

I claim as my invention:

1. A wheel rim provided with a peripheral bead at one side of the rim, in combination with a pneumatic tire comprising a pneumatic tube and a shoe adapted to cover said tube, said shoe being provided with securing rings on its opposite edges, one ring lying on one side of said bead and the other ring lying on the other side of said bead and outside said shoe, whereby said tire is secured to said wheel rim and out of alinement therewith, substantially as described.

2. The combination with a wheel rim having a peripheral bead, of a tire and means in connection therewith for securing the same to the rim by said bead so that said rim projects beyond the tire on one side and the tire projects beyond the rim on the other side.

In testimony whereof I have signed my name to this specification, in the presence of two subscribing witnesses.

ANTOINE WOLBER.

Witnesses:
 LEON CRANELSEN,
 H. C. COXE.